(12) United States Patent
Glovier et al.

(10) Patent No.: US 12,342,744 B2
(45) Date of Patent: Jul. 1, 2025

(54) SYSTEM AND METHOD FOR DETECTING GROUND-ENGAGING TOOL PLUGGING ON AN AGRICULTURAL IMPLEMENT

(71) Applicant: CNH Industrial America LLC, New Holland, PA (US)

(72) Inventors: Scott Glovier, Lombard, IL (US); Joshua D. Knoblauch, Lowpoint, IL (US)

(*) Notice: Subject to any disclaimer, the term of this patent is extended or adjusted under 35 U.S.C. 154(b) by 343 days.

(21) Appl. No.: 17/888,809

(22) Filed: Aug. 16, 2022

(65) Prior Publication Data
US 2024/0057504 A1 Feb. 22, 2024

(51) Int. Cl.
*A01B 76/00* (2006.01)
*G06T 7/00* (2017.01)

(52) U.S. Cl.
CPC ............ A01B 76/00 (2013.01); G06T 7/0002 (2013.01); *G06T 2207/30188* (2013.01)

(58) Field of Classification Search
CPC ..... A01B 76/00; A01B 49/027; A01B 69/001; A01B 79/005; G06T 7/0002; G06T 2207/30188
See application file for complete search history.

(56) References Cited

U.S. PATENT DOCUMENTS

| | | | |
|---|---|---|---|
| 6,853,937 B2 * | 2/2005 | Shibusawa | A01B 79/005 702/100 |
| 10,492,353 B2 | 12/2019 | Kovach et al. | |
| 10,806,069 B2 | 10/2020 | Beaujot | |
| 11,234,355 B2 | 2/2022 | Smith et al. | |
| 11,266,056 B2 | 3/2022 | Nair et al. | |
| 11,301,694 B2 * | 4/2022 | Stanhope | G06F 18/241 |
| 2018/0224537 A1 * | 8/2018 | Taylor | G01S 13/58 |
| 2020/0344939 A1 * | 11/2020 | Sporrer | A01B 33/16 |
| 2020/0387720 A1 * | 12/2020 | Stanhope | A01B 79/02 |
| 2020/0404829 A1 | 12/2020 | Knobloch et al. | |
| 2021/0105928 A1 | 4/2021 | Henry | |
| 2021/0108951 A1 | 4/2021 | Smith | |
| 2021/0120730 A1 * | 4/2021 | Anderson | G06Q 10/047 |
| 2021/0123728 A1 * | 4/2021 | Smith | A01B 15/16 |
| 2021/0192294 A1 * | 6/2021 | Stanhope | G06F 18/2178 |
| 2022/0125032 A1 * | 4/2022 | Ascherl | A01M 7/0089 |
| 2022/0192076 A1 * | 6/2022 | Sharma | G05D 1/0088 |
| 2023/0094319 A1 * | 3/2023 | Hansen | A01B 69/008 701/50 |
| 2023/0354735 A1 * | 11/2023 | Fior | A01C 7/201 |
| 2024/0264601 A1 * | 8/2024 | Cozza | G05D 1/106 |
| 2025/0037265 A1 * | 1/2025 | Cozza | B64U 50/13 |

* cited by examiner

*Primary Examiner* — Wesley J Tucker
(74) *Attorney, Agent, or Firm* — Rebecca Henkel; Peter K. Zacharias; Rickard K. DeMille (57) ABSTRACT

An agricultural implement includes a ground-engaging tool and a computing system. In this respect, the computing system is configured to determine a surface profile of a portion of a field positioned aft of the ground-engaging tool based on the image data generated by a first imaging device. Moreover, the computing system is configured to determine a surface profile of a portion of the field positioned forward of the ground-engaging tool based on the image data generated by a second imaging device. In addition, the computing system is configured to determine when the ground-engaging tool is plugged based on the surface profile of the portion of the field positioned aft of the ground-engaging tool and the surface profile of the portion of the field positioned forward of the ground-engaging tool.

20 Claims, 5 Drawing Sheets

SYSTEM AND METHOD FOR DETECTING GROUND-ENGAGING TOOL PLUGGING ON AN AGRICULTURAL IMPLEMENT

FIELD OF THE INVENTION

The present disclosure generally relates to agricultural implements and, more particularly, to systems and methods for detecting ground-engaging tool plugging on an agricultural implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. In general, tillage implements include ground-engaging tools, such as shanks, disks, and/or the like, supported on its frame. Each ground-engaging tool, in turn, is configured to be moved relative to the soil within the field as the tillage implement travels across the field. Such movement of the ground-engaging tools loosens and/or otherwise agitates the soil to prepare the field for subsequent planting operations.

During tillage operations, field materials, such as residue, soil, and/or the like, may accumulate on the ground-engaging tools. When the accumulation of field materials of a ground-engaging tool becomes sufficient to impact its operation, the tool is plugged. In such instances, it is necessary for the operator to take certain corrective actions to remove the accumulated field materials. However, it may be difficult for the tillage implement operator to determine when a ground-engaging tool is plugged. In this respect, systems have been developed to detect ground-engaging tool plugging during tillage operations. While such systems work well, further improvements are needed.

Accordingly, an improved system and method for detecting ground-engaging tool plugging on an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural implement including a frame and a ground-engaging tool supported on the frame, with the ground-engaging tool configured to be moved relative to soil within a field as the agricultural implement travels across the field in a travel direction. The agricultural implement includes a first imaging device configured to generate image data depicting a portion of the field positioned aft of the ground-engaging tool relative to the travel direction. Furthermore, the agricultural implement includes a second imaging device configured to generate image data depicting a portion of the field positioned forward of the ground-engaging tool relative to the travel direction. Additionally, the agricultural implement includes a computing system communicatively coupled to the first and second imaging devices. In this respect, the computing system is configured to determine a surface profile of the portion of the field positioned aft of the ground-engaging tool based on the image data generated by the first imaging device. Moreover, the computing system is configured to determine a surface profile of the portion of the field positioned forward of the ground-engaging tool based on the image data generated by the second imaging device. In addition, the computing system is configured to determine when the ground-engaging tool is plugged based on the surface profile of the portion of the field positioned aft of the ground-engaging tool and the surface profile of the portion of the field positioned forward of the ground-engaging tool.

In another aspect, the present subject matter is directed to a system for detecting ground-engaging tool plugging on an agricultural implement. The system includes a ground-engaging tool configured to be moved relative to soil within a field as the agricultural implement travels across the field in a travel direction. Furthermore, the system includes a first imaging device configured to generate image data depicting a portion of the field positioned aft of the ground-engaging tool relative to the travel direction. Additionally, the agricultural implement includes a second imaging device configured to generate image data depicting a portion of the field positioned forward of the ground-engaging tool relative to the travel direction. Moreover, the agricultural implement includes a computing system communicatively coupled to the first and second imaging devices. In this respect, the computing system is configured to determine a surface profile of the portion of the field positioned aft of the ground-engaging tool based on the image data generated by the first imaging device. In addition, the computing system is configured to determine a surface profile of the portion of the field positioned forward of the ground-engaging tool based on the image data generated by the second imaging device. Furthermore, the computing system is configured to determine when the ground-engaging tool is plugged based on the surface profile of the portion of the field positioned aft of the ground-engaging tool and the surface profile of the portion of the field positioned forward of the ground-engaging tool.

In a further aspect, the present subject matter is directed to a method for detecting ground-engaging tool plugging on an agricultural implement. The agricultural implement, in turn, includes a ground-engaging tool configured to be moved relative to soil within a field as the agricultural implement travels across the field in a travel direction. The method includes receiving, with a computing system, first image data depicting a portion of the field positioned aft of the ground-engaging tool relative to the travel direction. Additionally, the method includes determining, with the computing system, a surface profile of the portion of the field positioned aft of the ground-engaging tool based on the received first image data. Moreover, the method includes receiving, with the computing system, second image data depicting a portion of the field positioned forward of the ground-engaging tool relative to the travel direction. In addition, the method includes determining, with the computing system, a surface profile of the portion of the field positioned forward of the ground-engaging tool based on the received second image data. Furthermore, the method includes determining, with the computing system, when the ground-engaging tool is plugged based on the surface profile of the portion of the field positioned forward of the ground-engaging tool and the surface profile of the portion of the field positioned aft of the ground-engaging tool. Additionally, the method includes initiating, with the computing system, a control action associated with de-plugging the ground-engaging tool when it is determined that the ground-engaging tool is plugged.

These and other features, aspects and advantages of the present technology will become better understood with reference to the following description and appended claims.

The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and a method for detecting ground-engaging tool plugging on an agricultural implement. As will be described below, the agricultural implement includes one or more ground-engaging tools (e.g., a shank(s), a disk(s), a leveling blade(s), etc.) supported on its frame. In this respect, as the agricultural implement travels across a field, the ground-engaging tool(s) is configured to be moved relative to the soil such that an agricultural operation (e.g., a tillage operation) is performed on the field. During operation, field materials (e.g., soil, residue, etc.) may accumulate on the ground-engaging tool(s). When a sufficient amount of field materials accumulates on a ground-engaging tool, the operation of such tool may be impacted. In such instances, that ground-engaging tool is considered plugged.

In several embodiments, a computing system of the disclosed system is configured to detect plugging of the ground-engaging tool(s) based on the surface profiles of the field forward and aft of the tool(s). More specifically, the computing system is configured to determine a surface profile of a portion of the field positioned aft of the ground-engaging tool(s) based on image data depicting such portion of the field. Similarly, the computing system is configured to determine a surface profile of a portion of the field positioned forward of the ground-engaging tool(s) based on image data depicting such portion of the field. Additionally, the computing system is configured to determine when the ground-engaging tool(s) is plugged based on the determined surface profiles. For example, in some embodiments, the computing system may compare the surface profile of the portion of the field positioned aft of the ground-engaging tool(s) to the surface profile of the portion of the field positioned forward of the ground-engaging tool(s). Thereafter, when the surface profile of the portion of the field positioned aft of the ground-engaging tool(s) differs from the surface profile of the portion of the field positioned forward of the ground-engaging tool(s) by more than a predetermined amount, the computing system determines that the ground-engaging tool(s) is plugged. Conversely, when the surface profile of the portion of the field positioned aft of the ground-engaging tool(s) does not differ from the surface profile of the portion of the field positioned forward of the ground-engaging tool(s) by more than the predetermined amount, the computing system determines that the ground-engaging tool(s) is not plugged.

Using the surface profiles of the field forward and aft of the ground-engaging tool(s) to determine when such tool(s) is plugged improves the operation of agricultural implement. More specifically, the presence of a divot, trench, or other surface profile irregularity behind a ground-engaging tool may be indicative of plugging of that tool. However, these surface irregularities may also be formed by animals, the wheels of other vehicles/implements that have previously traversed the field, and/or the like. In this respect, using only the surface profile of the field aft of the ground-engaging tool(s) to detect plugging of such tool(s) may result in a determination that a tool is plugged when the tool is, in fact, not plugged. However, the surface profile of the field forward of the tool(s) provides an indication of whether the surface irregularity was present before the tool(s) engaged that portion of the field. As such, by using both the surface profile of the field aft of the tool(s) and the surface profile of the field forward of the tool(s), the disclosed system and method can determine whether a surface profile irregularity was caused by a plugged ground-engaging tool or by some other means. Thus, the disclosed system and method provide more accurate detections of ground-engaging tool plugging.

Figure 1:
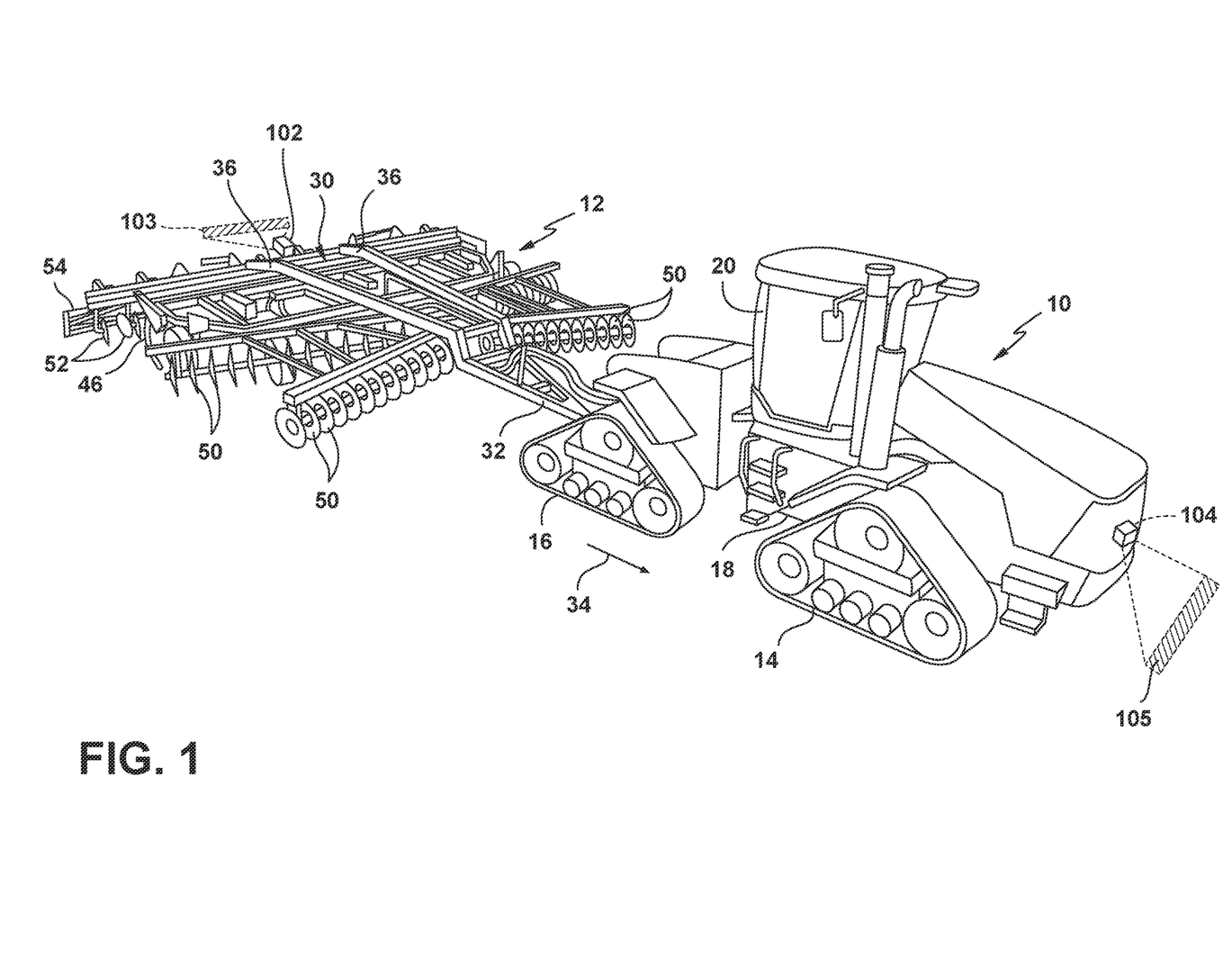
FIG. 1 illustrates a perspective view of one embodiment of a work vehicle towing an agricultural implement in accordance with aspects of the present subject matter.
Figure 2:
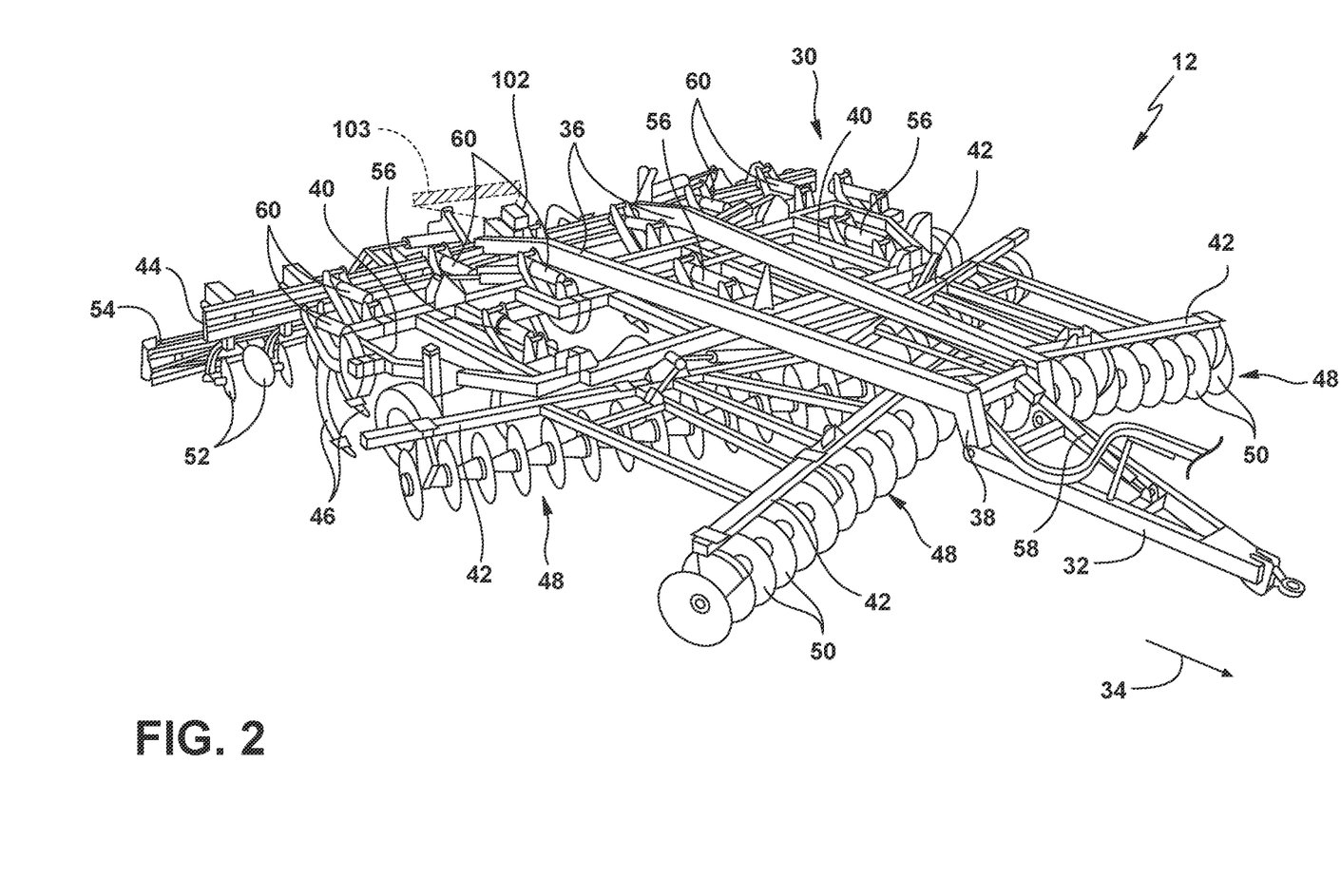
FIG. 2 illustrates a perspective view of the agricultural implement shown in FIG. 1.

Referring now to drawings, FIGS. 1 and 2 illustrate perspective views of one embodiment of a work vehicle 10 and an associated agricultural implement 12 in accordance with aspects of the present subject matter. Specifically, FIG. 1 illustrates a perspective view of the work vehicle 10 towing the agricultural implement 12 across a field in a travel direction (e.g., as indicated by arrow 34). Additionally, FIG. 2 illustrates a perspective view of the agricultural implement 12 shown in FIG. 1.

As shown in the illustrated embodiment, the work vehicle 10 is configured as an agricultural tractor and the agricultural implement 12 is configured as a tillage implement. However, in other embodiments, the work vehicle 10 may be configured as any other suitable agricultural or other type of work vehicle. Similarly, in other embodiments, the agricultural implement 12 may be configured as any other suitable agricultural implement configured to be towed by a work vehicle.

As particularly shown in FIG. 1, the work vehicle 10 includes a pair of front track assemblies 14, a pair or rear track assemblies 16, and a frame or chassis 18 coupled to and supported by the track assemblies 14, 16. An operator's cab 20 may be supported by a portion of the chassis 18 and may house various input devices for permitting an operator to control the operation of one or more components of the work vehicle 10 and/or one or more components of the implement 12. Additionally, the work vehicle 10 may include an engine 22 (FIG. 3) and a transmission 24 (FIG. 3) mounted on the chassis 18. The transmission 24 may be operably coupled to the engine 22 and may provide variably adjusted gear ratios for transferring engine power to the track assemblies 14, 16 via a drive axle assembly (not shown) (or via axles if multiple drive axles are employed).

Additionally, as shown in FIGS. 1 and 2, the implement 12 may generally include a carriage frame assembly 30 configured to be towed by the work vehicle 10 via a pull hitch or tow bar 32 in the travel direction of the vehicle 34 of the vehicle/implement 10/12. In general, the carriage frame assembly 30 may support a plurality of ground-engaging tools, such as a plurality of shanks, disk blades, leveling blades, basket assemblies, tines, spikes, and/or the like. In several embodiments, the various ground-engaging tools may be configured to perform a tillage operation or any other suitable ground-engaging operation across the field along which the implement 12 is being towed.

As particularly shown in FIG. 2, the carriage frame assembly 30 may include aft extending carrier frame members 36 coupled to the tow bar 32. In addition, reinforcing gusset plates 38 may be used to strengthen the connection between the tow bar 32 and the carrier frame members 36. In several embodiments, the carriage frame assembly 30 may generally support a central frame 40, a forward frame 42 positioned forward of the central frame 40 relative to a travel direction of the vehicle/implement 10/12, and an aft frame 44 positioned aft of the central frame 40 relative to the direction of travel 34 of the vehicle/implement 10/12. As shown, in one embodiment, the central frame 40 may correspond to a shank frame configured to support a plurality of ground-engaging shanks 46. In such an embodiment, the shanks 46 may be configured to till or otherwise engage the soil as the implement 12 is towed across the field. However, in other embodiments, the central frame 40 may be configured to support any other suitable ground-engaging tools.

Additionally, as shown in FIG. 2, in one embodiment, the forward frame 42 may correspond to a disk frame configured to support various gangs or sets 48 of disk blades 50. In such an embodiment, each disk blade 50 may, for example, include both a concave side (not shown) and a convex side (not shown). In addition, the various gangs 48 of disk blades 50 may be oriented at an angle relative to the travel direction 34 of the vehicle/implement 10/12 to promote more effective tilling of the soil. However, in other embodiments, the forward frame 42 may be configured to support any other suitable ground-engaging tools.

Moreover, like the central and forward frames 40, 42, the aft frame 44 may also be configured to support a plurality of ground-engaging tools. For instance, in the illustrated embodiment, the aft frame is configured to support a plurality of leveling blades 52 and rolling (or crumbler) basket assemblies 54. However, in other embodiments, any other suitable ground-engaging tools may be coupled to and supported by the aft frame 44, such as a plurality of closing disks.

In addition, the implement 12 may also include any number of suitable ground-engaging tool actuators (e.g., hydraulic cylinders) for adjusting the relative positioning of, the penetration depth of, and/or the force being applied to the various ground-engaging tools 46, 50, 52, 54. For instance, the implement 12 may include one or more first ground-engaging tool actuators 56 coupled to the central frame 40 for raising or lowering the central frame 40 relative to the ground, thereby allowing the penetration depth of and/or the force being applied to the shanks 46 to be adjusted. Similarly, the implement 12 may include one or more second ground-engaging tool actuators 58 coupled to the forward frame 42 to adjust the penetration depth of and/or the force being applied to the disk blades 50. Moreover, the implement 12 may include one or more third ground-engaging tool actuators 60 coupled to the aft frame 44 to allow the aft frame 44 to be moved relative to the central frame 40, thereby allowing the relevant operating parameters of the ground-engaging tools 52, 54 supported by the aft frame 44 (e.g., the force being applied to and/or the penetration depth of) to be adjusted.

The configuration of the work vehicle 10 described above and shown in FIG. 1 is provided only to place the present subject matter in an exemplary field of use. Thus, the present subject matter may be readily adaptable to any manner of work vehicle configuration.

Additionally, the configuration of the agricultural implement 12 described above and shown in FIGS. 1 and 2 is only provided for exemplary purposes. Thus, the present subject matter may be readily adaptable to any manner of implement configuration. For example, the agricultural implement 12 may be configured as a planting implement, a fertilizing implement, and/or any other suitable type of agricultural implement.

Moreover, the work vehicle 10 and/or the agricultural implement 12 may include first and second imaging device 102, 104 coupled thereto and/or supported thereon. Specifically, as shown in FIGS. 1 and 2, the first imaging device 102 may be in operative association with the work vehicle 10 and/or the agricultural implement 12 such that the first imaging device 102 has a field of view or sensor detection range 103 directed towards a portion of the field positioned aft of the ground-engaging tools 46, 50, 52 of the implement 12 relative to the travel direction 34. In this respect, as the vehicle/implement 10/12 travels across the field, the first imaging device 102 is configured to generate image data depicting the portion of the field within its field of view 103, namely the portion of the field positioned aft of the ground-engaging tools 46, 50, 52. Furthermore, as particularly shown in FIG. 1, the second imaging device 104 may be in operative association with the work vehicle 10 and/or the implement 12 such that the second imaging device 104 has a field of view or sensor detection range 105 directed towards a portion of the field positioned forward of the ground-engaging tools 46, 50, 52 relative to the travel direction 34. Thus, as the vehicle/implement 10/12 travels across the field, the second imaging device 104 is configured to generate image data depicting the portion of the field within its field of view 105, namely the portion of the field positioned forward of the ground-engaging tools 46, 50, 52. As will be described below, image data generated by the first and second imaging devices 102, 104 is used to detect when one or more of the ground-engaging tools 46, 50, 52 of the implement 12 are plugged.

In general, the first and second imaging devices 102, 104 may correspond to any suitable sensing devices configured to generate image data or image-like data depicting the surface profile of the field. For instance, in several embodiments, the first and second imaging devices 102, 104 may correspond to first and second Light Detection and Ranging ("LiDAR") devices, such as first and second LIDAR scanners. In such embodiments, the first and second imaging devices 102, 104 may be configured to output light pulses from light sources (e.g., lasers outputting a pulsed laser beam) and detect the reflection of each pulse off of the soil surface. Based on the time of flight of the light pulses, the specific location (e.g., 3-D coordinates) of the soil surface relative to the first and second imaging devices 102, 104 may be calculated. By scanning the pulsed light over a given swath width, the surface profile of the soil may be detected across a given section of the field.

In another embodiment, the first and second imaging devices 102, 104 may correspond to suitable cameras configured to capture three-dimensional images of the soil surface, thereby allowing the soil surface profile to be calculated or estimated by analyzing the content of each image. For instance, in a particular embodiment, the first and second imaging devices 102, 104 may correspond to first and second stereographic cameras having two or more lenses with a separate image sensor for each lens to allow the cameras to capture stereographic or three-dimensional images. In a further embodiment, the first and second imaging devices 102, 104 may correspond to any other suitable sensing devices configured to detect or capture surface profile data using a non-contact detection methodology, such as acoustic sensors or electromagnetic sensors. For instance, the first and second imaging devices 102, 104 may correspond to first and second ultrasound devices configured to emit ultrasound waves and detect the reflection of such waves off of the soil surface to allow the surface profile to be estimated. Alternatively, the first and second imaging devices 102, 104 may correspond to first and second radar devices configured to emit radar waves and detect the reflection of such waves off of the soil surface to allow the surface profile to be estimated.

The first imaging device 102 may be mounted at any suitable location on the work vehicle 10 or the agricultural implement 12 that allows the first imaging device 102 to generate image data depicting a portion of the field aft of the ground-engaging tools 46, 50, 52 of the implement 12. For example, in the illustrated embodiment, the first imaging device 102 is mounted on the aft end of the carriage frame assembly 30 of the agricultural implement 12.

Similarly, the second imaging device 104 may be mounted at any suitable location on the work vehicle 10 or the agricultural implement 12 that allows the second imaging device 104 to generate image data depicting a portion of the field forward of the ground-engaging tools 46, 50, 52 of the implement 12. For example, in the illustrated embodiment, the second imaging device 104 is mounted on the forward end of the work vehicle 10.

Additionally, in the illustrated embodiment, a single first imaging device 102 and a single second imaging device 104 are in operative association with the work vehicle 10 and the agricultural implement 12. However, in alternative embodiments, multiple first imaging devices 102 and/or multiple second imaging device 104 may be in operative association with the work vehicle 10 and/or the agricultural implement 12.

Figure 3:
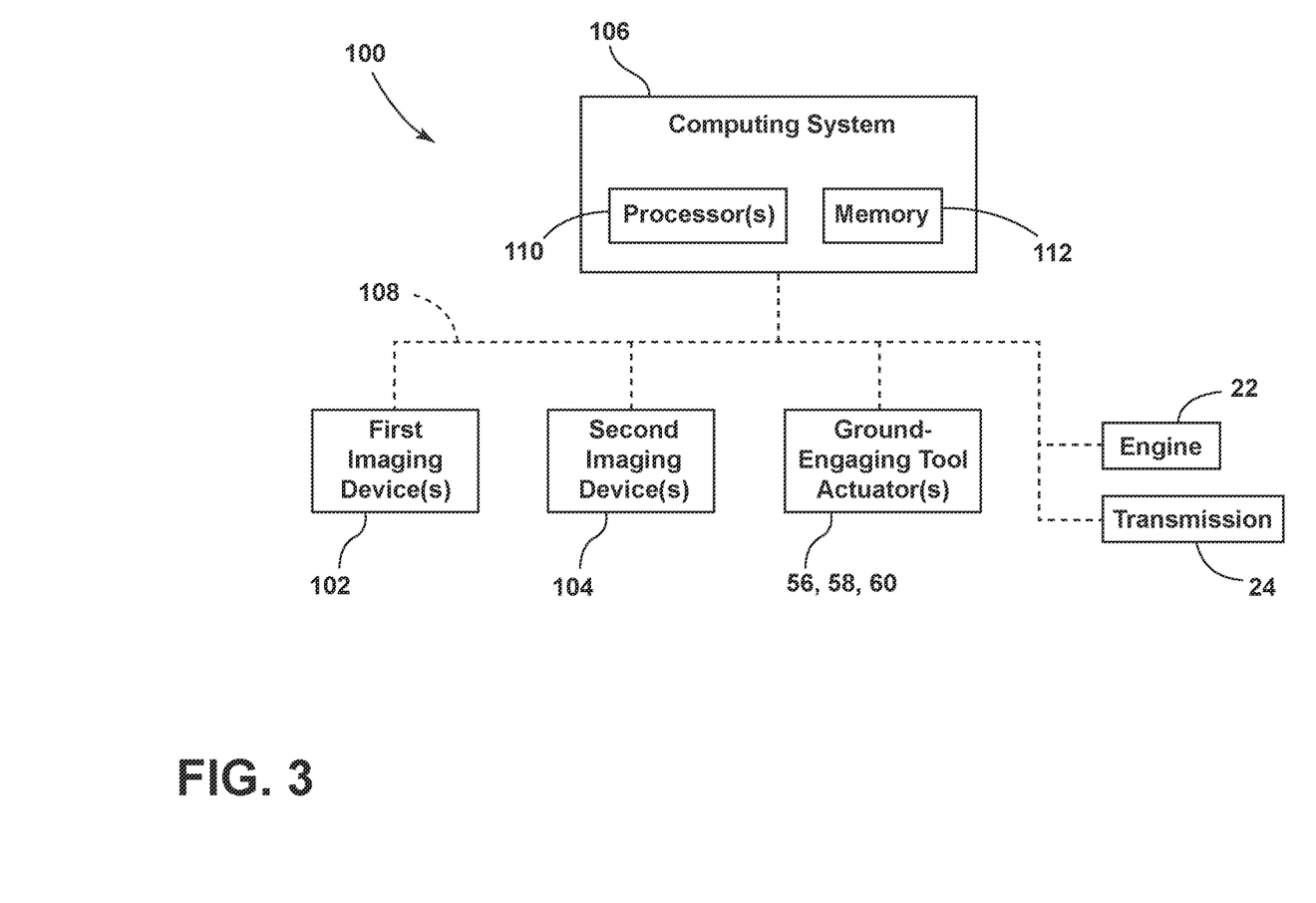
FIG. 3 illustrates a schematic view of one embodiment of a system for detecting ground-engaging tool plugging on an agricultural implement in accordance with aspects of the present subject matter.

Referring now to FIG. 3, a schematic view of one embodiment of a system 100 for detecting ground-engaging tool plugging on an agricultural implement is illustrated in accordance with aspects of the present subject matter. In general, the system 100 will be described herein with reference to the work vehicle 10 and the agricultural implement 12 described above with reference to FIGS. 1 and 2. However, it should be appreciated by those of ordinary skill in the art that the disclosed system 100 may generally be utilized with work vehicles having any other suitable vehicle configuration and/or agricultural implements having any other suitable implement configuration.

As shown in FIG. 3, the system includes one or more components of the work vehicle 10 and/or the agricultural implement 12. For example, in the illustrated embodiment, the system 100 includes the first imaging device(s) 102; the second imaging device(s) 104; the ground-engaging tool actuator(s) 56, 58, 60; the engine 22; and the transmission 24. However, in alternative embodiments, the system 100 may include any other suitable components of the work vehicle 10 and/or the agricultural implement 12 in addition to or in lieu of the aforementioned components.

Moreover, the system 100 includes a computing system 106 communicatively coupled to one or more components of the work vehicle 10, the agricultural implement 12, and/or the system 100 to allow the operation of such components to be electronically or automatically controlled by the computing system 106. For instance, the computing system 106 may be communicatively coupled to the first and second imaging devices 102, 104 via a communicative link 108. As such, the computing system 106 may be configured to receive image data from the first and second imaging devices 102, 104 depicting portions of the field aft of and forward of the ground-engaging tools 46, 50, 52 of the implement 12. Furthermore, the computing system 106 may be communicatively coupled to the ground-engaging tool actuators 56, 58, 60 via the communicative link 108. In this respect, the computing system 106 may be configured to control the operation of the ground-engaging tool actuators 56, 58, 60 to adjust the operation of the associated ground-engaging tools. Furthermore, the computing system 106 may be communicatively coupled to the engine 22 and/or the transmission 24 via the communicative link 108. As such, the computing system 106 may be configured to control the operation of the engine 22 and/or the transmission 24 to adjust the ground speed of the vehicle/implement 10/12. In addition, the computing system 106 may be communicatively coupled to any other suitable components of the work vehicle 10, the agricultural implement 12, and/or the system 100.

In general, the computing system 106 may comprise one or more processor-based devices, such as a given controller or computing device or any suitable combination of controllers or computing devices. Thus, in several embodiments, the computing system 106 may include one or more processor(s) 110 and associated memory device(s) 112 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 112 of the computing system 106 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 112 may generally be configured to store suitable computer-readable instructions that, when implemented by the processor(s) 110, configure the computing system 106 to perform various computer-implemented functions, such as one or more aspects of the methods and algorithms that will be described herein. In addition, the computing system 106 may also include various other suitable components, such as a communications circuit or module, one or more input/output channels, a data/control bus and/or the like.

The various functions of the computing system 106 may be performed by a single processor-based device or may be distributed across any number of processor-based devices, in which instance such devices may be considered to form part of the computing system 106. For instance, the functions of the computing system 106 may be distributed across multiple application-specific controllers or computing devices, such as a navigation controller, an engine controller, a transmission controller, an implement controller, and/or the like.

Figure 4:
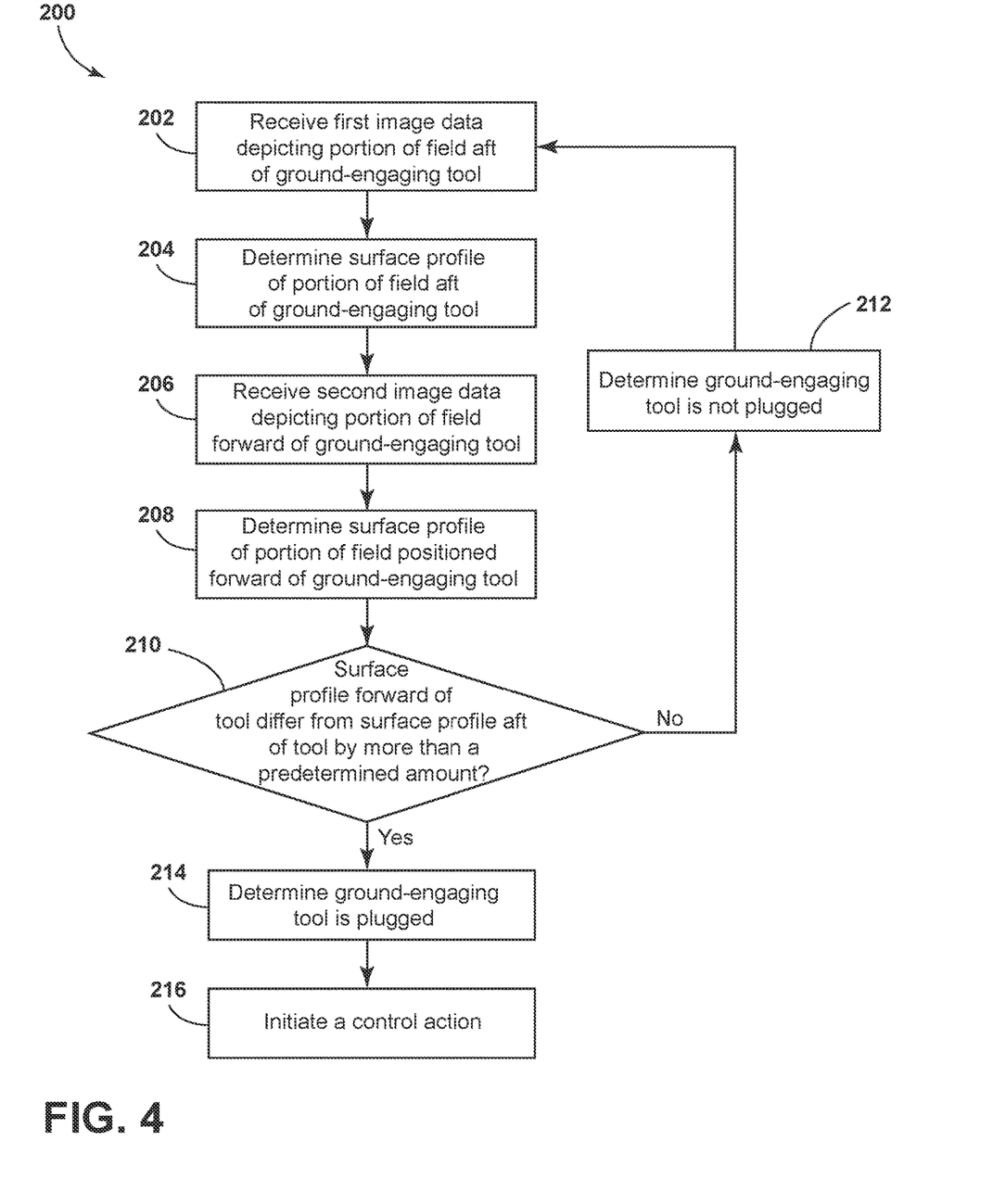
FIG. 4 illustrates a flow diagram providing one embodiment of control logic for detecting ground-engaging tool plugging on an agricultural implement in accordance with aspects of the present subject matter.

Referring now to FIG. 4, a flow diagram of one embodiment of example control logic 200 that may be executed by the computing system 106 (or any other suitable computing system) for detecting ground-engaging tool plugging on an agricultural implement is illustrated in accordance with aspects of the present subject matter. Specifically, the control logic 200 shown in FIG. 4 is representative of steps of one embodiment of an algorithm that can be executed to detect ground-engaging tool plugging on an agricultural implement with improved accuracy and less false positive plugging determinations. Thus, in several embodiments, the control logic 200 may be advantageously utilized in association with a system installed on or forming part of a work vehicle and/or an agricultural implement to allow for real-time control of detection of ground-engaging tool plugging without requiring substantial computing resources and/or processing time. However, in other embodiments, the control logic 200 may be used in association with any other suitable system, application, and/or the like for detecting ground-engaging tool plugging on an agricultural implement.

As shown, at (202), the control logic 200 includes receiving first image data depicting a portion of a field positioned aft of a ground-engaging tool of an agricultural implement relative to a travel direction of the agricultural implement. Specifically, as mentioned above, in several embodiments, the computing system 106 may be communicatively coupled to the first imaging device(s) 102 via the communicative link 108. In this respect, as the vehicle/implement 10/12 travels across the field to perform an agricultural operation (e.g., a tillage operation) thereon, the computing system 106 may receive first image data from the first imaging device(s) 102. Such first image data may, in turn, depict a portion(s) of the field position aft of the ground-engaging tools 46, 50, 52 of the agricultural implement 12.

Furthermore, at (204), the control logic 200 includes determining a surface profile of the portion of the field positioned aft of the ground-engaging tool based on the received first image data. Specifically, in several embodiments, the computing system 106 is configured to analyze the first image data received at (202) to determine the surface profile or contour of the portion(s) of the field positioned aft of the ground-engaging tools 46, 50, 52. In some embodiments, when determining the surface profile, the computing system 106 may identify the presence of divots, trenches, or other surface irregularities aft of the ground-engaging tools 46, 50, 52.

Additionally, at (206), the control logic 200 includes receiving second image data depicting a portion of a field positioned forward of the ground-engaging tool relative to the travel direction. Specifically, as mentioned above, in several embodiments, the computing system 106 may be communicatively coupled to the second imaging device(s) 104 via the communicative link 108. In this respect, as the vehicle/implement 10/12 travels across the field to perform the agricultural operation, the computing system 106 may receive second image data from the second imaging device(s) 104. Such second image data may, in turn, depict a portion(s) of the field position forward of the ground-engaging tools 46, 50, 52 of the agricultural implement 12.

Moreover, at (208), the control logic 200 includes determining a surface profile of the portion of the field positioned forward of the ground-engaging tool based on the received second image data. Specifically, in several embodiments, the computing system 106 is configured to analyze the second image data received at (206) to determine the surface profile or contour of the portion(s) of the field positioned forward of the ground-engaging tools 46, 50, 52. In some embodiments, when determining the surface profile, the computing system 106 may determine whether any divots, trenches, or other surface irregularities identified in the surface profile of the portion(s) of the field aft of the ground-engaging tools 46, 50, 52 are also present within the surface profile of the portion(s) of the field forward of the tools 46, 50, 52. In some embodiments, (206) and (208) may be performed before (202) and (204). As will be described below, the surface profile of the portion(s) of the field aft of the ground-engaging tools 46, 50, 52 and the surface profile of the portion(s) of the field forward of the tools 46, 50, 52 are used to determine when the tools 46, 50, 52 are plugged.

In addition, at (210), the control logic 200 includes comparing the surface profile of the portion of the field positioned aft of the ground-engaging tool to the surface profile of the portion of the field positioned forward of the ground-engaging tool. Specifically, in several embodiments, the computing system 106 is configured to compare the surface profile of the portion(s) of the field aft of the ground-engaging tools 46, 50, 52 determined at (204) to the surface profile of the portion(s) of the field forward of the ground-engaging tools 46, 50, 52 determined at (208).

In general, when the surface profile of the portion(s) of the field aft of the ground-engaging tool(s) 46, 50, 52 is similar to the surface profile of the portion(s) of the field forward of the ground-engaging tools 46, 50, 52, the tools 46, 50, 52 are not plugged. Specifically, when the surface profile of the portion(s) of the field aft of the ground-engaging tool(s) 46, 50, 52 does not differ from the surface profile of the portion(s) of the field forward of the ground-engaging tools 46, 50, 52 by more than a predetermined amount (with the predetermined amount being indicative of the effect that the ground-engaging tool(s) 46, 50, 52 have on the surface profile during non-plugged operation), the tools 46, 50, 52 are not plugged. For example, when all divots present within the surface profile of the portion(s) of the field aft of the ground-engaging tool(s) 46, 50, 52 are present within the surface profile of the portion(s) of the field forward of the ground-engaging tools 46, 50, 52, the tools 46, 50, 52 are not plugged. In such instances, the control logic 200 proceeds to (212).

Conversely, when the surface profile of the portion(s) of the field aft of the ground-engaging tool(s) 46, 50, 52 varies significantly from the surface profile of the portion(s) of the field forward of the ground-engaging tools 46, 50, 52, the tools 46, 50, 52 are plugged. Specifically, when the surface profile of the portion(s) of the field aft of the ground-engaging tool(s) 46, 50, 52 differs from the surface profile of the portion(s) of the field forward of the ground-engaging tools 46, 50, 52 by more than the predetermined amount, one or more of the tools 46, 50, 52 are plugged. For example, when a divot present within the surface profile of the portion(s) of the field aft of the ground-engaging tool(s) 46, 50, 52 is not present within the surface profile of the portion(s) of the field forward of the ground-engaging tools 46, 50, 52 or is of substantially different shape or depth, the tool 46, 50, 52 aligned with such divot is plugged. Thereafter, the control logic 200 proceeds to (214).

Furthermore, at (212), the control logic 200 includes determining that the ground-engaging tool is not plugged. Specifically, in several embodiments, as mentioned above, when the surface profile of the portion(s) of the field aft of the ground-engaging tool(s) 46, 50, 52 does not differ from the surface profile of the portion(s) of the field forward of the ground-engaging tools 46, 50, 52 by more than the predetermined amount, the computing system 106 determines that the tools 46, 50, 52 are not plugged. For example, when all divots present within the surface profile of the portion(s) of the field aft of the ground-engaging tool(s) 46, 50, 52 are present within the surface profile of the portion(s) of the field forward of the ground-engaging tools 46, 50, 52, the computing system 106 determines that the tools 46, 50, 52 are not plugged. Thereafter, the control logic 200 returns (202).

Conversely, at (214), the control logic 200 includes determining that the ground-engaging tool is plugged. Specifically, in several embodiments, as mentioned above, when the surface profile of the portion(s) of the field aft of the ground-engaging tool(s) 46, 50, 52 differs from the surface profile of the portion(s) of the field forward of the ground-engaging tools 46, 50, 52 by more than the predetermined amount, the computing system 106 determines that one or more of the tools 46, 50, 52 are plugged. For example, when a divot present within the surface profile of the portion(s) of the field aft of the ground-engaging tool(s) 46, 50, 52 is not present within the surface profile of the portion(s) of the field forward of the ground-engaging tools 46, 50, 52, the computing system 106 determines that the corresponding tool 46, 50, 52 is plugged.

Additionally, at (216), the control logic 200 includes initiating a control action associated with de-plugging the ground-engaging tool. Specifically, when it determined that one or more of the ground-engaging tools 46, 50, 52 are plugged, the computing system 106 may initiate one or more control actions associated with de-plugging the tool(s) 46, 50, 52. For example, in some embodiments, the control action(s) may include adjusting an operating parameter(s) of the plugged ground-engaging tool(s) 46, 50, 52, such as the penetration depth, the force being applied thereto, and/or the like. In such embodiments, the computing system 106 may transmit control signals to the associated ground-engaging tool actuator(s) 56, 58, 60. Such control signals, in turn, may instruct the associated actuator(s) 56, 58, 60 to adjust the operating parameter(s) of the tool(s) 46, 50, 52 in a manner that de-plugs the tool(s) 46, 50, 52. Additionally, or as an alternative, the control action(s) may include adjusting the ground speed of the vehicle/implement 10/12. In such embodiments, the computing system 106 may transmit control signals to the engine 22 and/or the transmission 24. Such control signals may, in turn, instruct the engine 22 and/or the transmission 24 to adjust the ground speed of the vehicle/implement 10/12. However, in alternative embodiments, the computing system 106 may be configured to initiate any other suitable control actions in addition to or in lieu of adjusting penetration depth and ground speed.

Moreover, computing system 106 may be configured to initiate an adjustment(s) to an operating parameter(s) of the ground-engaging tools 46, 50, 52 based on the surface profile of the portion of the field positioned forward of the ground-engaging tools 46, 50, 52 determined at (208) when the tools 46, 50, 52 are not plugged. For example, in some embodiments, the computing system 106 may preemptively adjust the penetration depth of, the force being applied to, and/or the like of one or more of the ground-engaging tools 46, 50, 52, such as when the surface profile of the portion of the field positioned forward of the ground-engaging tools 46, 50, 52 is not within a predetermined range of surface profile positions.

Figure 5:
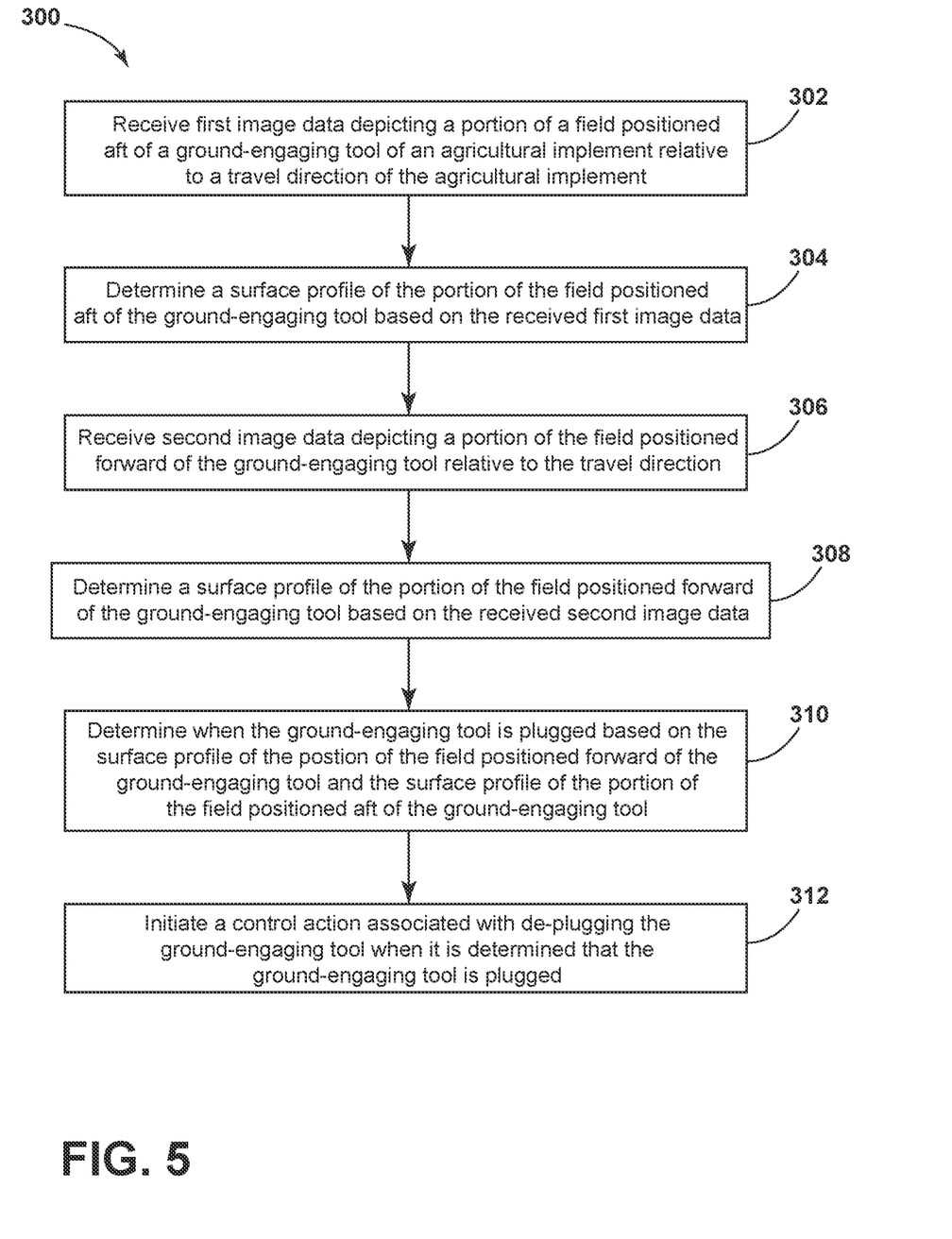
FIG. 5 illustrates a flow diagram of one embodiment of a method for detecting ground-engaging tool plugging on an agricultural implement in accordance with aspects of the present subject matter.

Referring now to FIG. 5, a flow diagram of one embodiment of a method 300 for detecting ground-engaging tool plugging on an agricultural implement is illustrated in accordance with aspects of the present subject matter. In general, the method 300 will be described herein with reference to the work vehicle 10, the agricultural implement 12, and the system 100 described above with reference to FIGS. 1-4. However, it should be appreciated by those of ordinary skill in the art that the disclosed method 300 may generally be implemented with any work vehicles having any suitable vehicle configuration, with agricultural implements having any suitable implement configuration, and/or within any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (302), the method 300 includes receiving, with a computing system, first image data depicting a portion of a field positioned aft of a ground-engaging tool of an agricultural implement relative to a travel direction of the agricultural implement. For instance, as described above, the computing system 106 is configured to receive first image data depicting a portion of a field positioned aft of the ground-engaging tools 46, 50, 52 of the agricultural implement 12 relative to a travel direction 34 of the vehicle/implement 10/12.

Furthermore, at (304), the method 300 includes determining, with the computing system, a surface profile of the portion of the field positioned aft of the ground-engaging tool based on the received first image data. For instance, as described above, the computing system 106 may be configured to determine a surface profile of the portion of the field positioned aft of the ground-engaging tools 46, 50, 52 based on the received first image data.

Additionally, as shown in FIG. 5, at (306), the method 300 includes receiving, with the computing system, second image data depicting a portion of a field positioned forward of the ground-engaging tool relative to the travel direction. For instance, as described above, the computing system 106 is configured to receive second image data depicting a portion of a field positioned forward of the ground-engaging tools 46, 50, 52 of the agricultural implement 12 relative to the travel direction 34.

Moreover, at (308), the method 300 includes determining, with the computing system, a surface profile of the portion of the field positioned forward of the ground-engaging tool based on the received second image data. For instance, as described above, the computing system 106 may be configured to determine a surface profile of the portion of the field positioned forward of the ground-engaging tools 46, 50, 52 based on the received second image data.

In addition, as shown in FIG. 5, at (310), the method 300 includes determining, with the computing system, when the ground-engaging tool is plugged based on the surface profile of the portion of the field positioned forward of the ground-engaging tool and the surface profile of the portion of the field positioned aft of the ground-engaging tool. For instance, as described above, the computing system 106 may be configured to determine when the ground-engaging tools 46, 50, 52 are plugged based on the surface profile of the portion of the field positioned forward of the tools 46, 50, 52 and the surface profile of the portion of the field positioned aft of the tool 46, 50, 52.

Furthermore, at (312), the method 300 includes initiating, with the computing system, a control action associated with de-plugging the ground-engaging tool when it is determined that the ground-engaging tool is plugged. For instance, as described above, when it is determined that the ground-engaging tool is plugged, the computing system 106 may be configured to initiate one or more control actions associated with de-plugging the ground-engaging tools 46, 50, 52, such as adjusting an operating parameter(s) of the tools 46, 50, 52 and/or the ground speed of the vehicle/implement 10/12.

It is to be understood that the steps of the control logic 200 and the method 300 are performed by the computing system 106 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 106 described herein, such as the control logic 200 and the method 300, is implemented in software code or instructions which are tangibly stored on a tangible computer readable medium. The computing system 106 loads the software code or instructions via a direct interface with the computer readable medium or via a wired and/or wireless network. Upon loading and executing such software code or instructions by the computing system 106, the computing system 106 may perform any of the functionality of the computing system 106 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural implement, comprising:
   a frame;
   a ground-engaging tool supported on the frame, the ground-engaging tool configured to be moved relative to soil within a field as the agricultural implement travels across the field in a travel direction;
   a first imaging device configured to generate image data depicting a portion of the field positioned aft of the ground-engaging tool relative to the travel direction;
   a second imaging device configured to generate image data depicting a portion of the field positioned forward of the ground-engaging tool relative to the travel direction; and
   a computing system communicatively coupled to the first and second imaging devices, wherein the computing system:
      determines a soil surface profile of the portion of the field positioned aft of the ground-engaging tool based on the image data generated by the first imaging device;
      determines a soil surface profile of the portion of the field positioned forward of the ground-engaging tool based on the image data generated by the second imaging device; and
      determines when the ground-engaging tool is plugged based on the soil surface profile of the portion of the field positioned aft of the ground-engaging tool and the soil surface profile of the portion of the field positioned forward of the ground-engaging tool.

2. The agricultural implement of claim 1, wherein, when determining when the ground-engaging tool is plugged, the computing system is configured to:
   compare the soil surface profile of the portion of the field positioned aft of the ground-engaging tool to the soil surface profile of the portion of the field positioned forward of the ground-engaging tool; and
   determine that the ground-engaging tool is plugged when the soil surface profile of the portion of the field positioned aft of the ground-engaging tool differs from the soil surface profile of the portion of the field positioned forward of the ground-engaging tool by more than a predetermined amount.

3. The agricultural implement of claim 1, wherein, when it is determined that the ground-engaging tool is plugged, the computing system is further configured to:
   initiate a control action associated with de-plugging the ground-engaging tool.

4. The agricultural implement of claim 1, wherein the first imaging device comprises a first LiDAR device and the second imaging device comprises a second LiDAR device.

5. The agricultural implement of claim 1, wherein the ground-engaging tool comprises a tillage shank.

6. A system for detecting ground-engaging tool plugging on an agricultural implement, the system comprising:
   a ground-engaging tool configured to be moved relative to soil within a field as the agricultural implement travels across the field in a travel direction;
   a first imaging device configured to generate image data depicting a portion of the field positioned aft of the ground-engaging tool relative to the travel direction;
   a second imaging device configured to generate image data depicting a portion of the field positioned forward of the ground-engaging tool relative to the travel direction; and a computing system communicatively coupled to the first and second imaging devices, wherein the computing system:
  determines a soil surface profile of the portion of the field positioned aft of the ground-engaging tool based on the image data generated by the first imaging device;
  determines a soil surface profile of the portion of the field positioned forward of the ground-engaging tool based on the image data generated by the second imaging device; and
  determines when the ground-engaging tool is plugged based on the soil surface profile of the portion of the field positioned aft of the ground-engaging tool and the soil surface profile of the portion of the field positioned forward of the ground-engaging tool.

7. The system of claim 6, wherein, when determining when the ground-engaging tool is plugged, the computing system is configured to:
  compare the soil surface profile of the portion of the field positioned aft of the ground-engaging tool to the soil surface profile of the portion of the field positioned forward of the ground-engaging tool; and
  determine that the ground-engaging tool is plugged when the soil surface profile of the portion of the field positioned aft of the ground-engaging tool differs from the soil surface profile of the portion of the field positioned forward of the ground-engaging tool by more than a predetermined amount.

8. The system of claim 6, wherein:
  when determining the soil surface profile of the portion of the field positioned aft of the ground-engaging tool, the computing system is configured to identify a presence of a divot within the portion of the field positioned aft of the ground-engaging tool; and
  when determining the soil surface profile of the portion of the field positioned forward of the ground-engaging tool, the computing system is configured to determine whether the divot is present within the portion of the field positioned forward of the ground-engaging tool.

9. The system of claim 8, wherein, when the presence of the divot within the portion of the field positioned aft of the ground-engaging tool is identified and the divot is determined to be present within the portion of the field positioned forward of the ground-engaging tool, the computing system is configured to determine that the ground-engaging tool is not plugged.

10. The system of claim 8, wherein, when the presence of the divot within the portion of the field positioned aft of the ground-engaging tool is identified and the divot is determined not to be present within the portion of the field positioned forward of the ground-engaging tool, the computing system is configured to determine that the ground-engaging tool is plugged.

11. The system of claim 6, wherein, when it is determined that the ground-engaging tool is plugged, the computing system is further configured to:
  initiate a control action associated with de-plugging the ground-engaging tool.

12. The system of claim 11, wherein the control action comprises adjusting an operating parameter of the ground-engaging tool.

13. The system of claim 11, wherein the control action comprises adjusting a ground speed of the agricultural implement.

14. The system of claim 6, wherein the computing system is further configured to:
  initiate an adjustment to an operating parameter of the ground-engaging tool based on the soil surface profile of the portion of the field positioned forward of the ground-engaging tool.

15. A method for detecting ground-engaging tool plugging on an agricultural implement, the agricultural implement including a ground-engaging tool configured to be moved relative to soil within a field as the agricultural implement travels across the field in a travel direction, the method comprising:
  receiving, with a computing system, first image data depicting a portion of the field positioned aft of the ground-engaging tool relative to the travel direction;
  determining, with the computing system, a soil surface profile of the portion of the field positioned aft of the ground-engaging tool based on the received first image data;
  receiving, with the computing system, second image data depicting a portion of the field positioned forward of the ground-engaging tool relative to the travel direction;
  determining, with the computing system, a soil surface profile of the portion of the field positioned forward of the ground-engaging tool based on the received second image data;
  determining, with the computing system, when the ground-engaging tool is plugged based on the soil surface profile of the portion of the field positioned forward of the ground-engaging tool and the soil surface profile of the portion of the field positioned aft of the ground-engaging tool; and
  initiating, with the computing system, a control action associated with de-plugging the ground-engaging tool when it is determined that the ground-engaging tool is plugged.

16. The method of claim 15, wherein determining when the ground-engaging tool is plugged comprises:
  comparing, with the computing system, the soil surface profile of the portion of the field positioned aft of the ground-engaging tool to the soil surface profile of the portion of the field positioned forward of the ground-engaging tool; and
  determining, with the computing system, that the ground-engaging tool is plugged when the soil surface profile of the portion of the field positioned aft of the ground-engaging tool differs from the soil surface profile of the portion of the field positioned forward of the ground-engaging tool by more than a predetermined amount.

17. The method of claim 15, wherein:
  determining the soil surface profile of the portion of the field positioned aft of the ground-engaging tool comprises identifying, with the computing system, a presence of a divot within the portion of the field positioned aft of the ground-engaging tool; and
  determining the soil surface profile of the portion of the field positioned forward of the ground-engaging tool comprises determining, with the computing system, whether the divot is present within the portion of the field positioned forward of the ground-engaging tool.

18. The method of claim 17, further comprising:
  determining, with the computing system, that the ground-engaging tool is not plugged when the presence of the divot within the portion of the field positioned aft of the ground-engaging tool is identified and the divot is determined to be present within the portion of the field positioned forward of the ground-engaging tool.

19. The method of claim 17, further comprising:
determining, with the computing system, that the ground-engaging tool is plugged when the presence of the divot within the portion of the field positioned aft of the ground-engaging tool is identified and the divot is determined not to be present within the portion of the field positioned forward of the ground-engaging tool.

20. The method of claim 15, wherein the control action comprises adjusting an operating parameter of the ground-engaging tool.

\* \* \* \* \*